United States Patent
Kuranari et al.

(10) Patent No.: US 9,969,835 B2
(45) Date of Patent: May 15, 2018

(54) POLYCARBONATE-MODIFIED ACRYLIC RESIN, COATING, AND PLASTIC MOLDING COATED WITH SAID COATING

(71) Applicant: DIC Corporation, Tokyo (JP)

(72) Inventors: Asuna Kuranari, Osaka (JP); Masaharu Takahashi, Osaka (JP)

(73) Assignee: DIC CORPORATION, Tokyo (JP)

( * ) Notice: Subject to any disclaimer, the term of this patent is extended or adjusted under 35 U.S.C. 154(b) by 274 days.

(21) Appl. No.: 15/024,321

(22) PCT Filed: Jul. 10, 2014

(86) PCT No.: PCT/JP2014/068421
§ 371 (c)(1),
(2) Date: Mar. 24, 2016

(87) PCT Pub. No.: WO2015/045562
PCT Pub. Date: Apr. 2, 2015

(65) Prior Publication Data
US 2016/0229941 A1    Aug. 11, 2016

(30) Foreign Application Priority Data
Sep. 30, 2013  (JP) ................. 2013-203981

(51) Int. Cl.
*C08F 230/00* (2006.01)
*C08F 283/02* (2006.01)
*C08F 20/10* (2006.01)
*C08F 18/00* (2006.01)
*C09D 151/08* (2006.01)
*C08J 7/04* (2006.01)

(52) U.S. Cl.
CPC ............ *C08F 283/02* (2013.01); *C08J 7/047* (2013.01); *C09D 7/40* (2018.01); *C09D 151/08* (2013.01); *C08J 2309/02* (2013.01); *C08J 2309/06* (2013.01); *C08J 2347/00* (2013.01); *C08J 2369/00* (2013.01); *C08J 2451/08* (2013.01)

(58) Field of Classification Search
CPC .... C08F 283/02; C08F 220/14; C08F 220/20; C08F 220/06; C08F 2220/1841; C09D 7/40; C09D 151/08; C08J 7/047; C08J 2309/06; C08J 2309/02; C08J 2451/08; C08J 2369/00; C08J 2347/00
USPC .................. 524/457; 525/468; 526/319, 320
See application file for complete search history.

(56) References Cited

U.S. PATENT DOCUMENTS

| 5,143,997 A | 9/1992 | Endo et al. |
| 2006/0205857 A1* | 9/2006 | Hofacker ............ C09D 133/14 524/457 |

FOREIGN PATENT DOCUMENTS

| CN | 1837251 A | 9/2006 |
| JP | 3-181517 A | 8/1991 |
| JP | 4-41517 A | 2/1992 |
| JP | 2002-216845 A | 8/2002 |
| JP | 2010-254948 A | 11/2010 |
| JP | 2011-207953 A | 10/2011 |
| JP | 2013-518137 A | 5/2013 |
| WO | 2007/145368 A1 | 12/2007 |
| WO | 2011/089154 A2 | 7/2011 |

OTHER PUBLICATIONS

International Search Report issued in corresponding PCT/JP2014/068421, dated Oct. 7, 2014.

* cited by examiner

*Primary Examiner* — William K Cheung
(74) *Attorney, Agent, or Firm* — McDermott Will & Emery LLP

(57) ABSTRACT

Provided is a polycarbonate-modified acrylic resin obtained by reacting an unsaturated monomer mixture (B), which contains, as essential components, methyl methacrylate, an unsaturated monomer (b1) having a hydroxyl group, an unsaturated monomer (b2) having a carboxyl group, and an unsaturated monomer (b3) having an alkyl group of 2 to 8 carbon atoms, in the presence of a polycarbonate diol (A) which is produced using 1,5-pentanediol and 1,6-hexanediol as starting materials, characterized in that the mass ratio of the unsaturated monomer (b2) in the unsaturated monomer mixture (B) is in the range of 0.1% to 1.6% by mass. The polycarbonate-modified acrylic resin has high adhesion to a plastic substrate and is capable of forming a coating film having excellent abrasion resistance, chemical resistance, feel, and appearance. Therefore, the polycarbonate-modified acrylic resin can be suitably used for a coating.

6 Claims, No Drawings

POLYCARBONATE-MODIFIED ACRYLIC RESIN, COATING, AND PLASTIC MOLDING COATED WITH SAID COATING

CROSS REFERENCE

This application is the U.S. National Phase under 35 US.C. § 371 of International Application No. PCT/JP2014/068421, filed on Jul. 10, 2014, which claims the benefit of Japanese Application No. 2013-203981, filed on Sep. 30, 2013, the entire contents of each are hereby incorporated by reference.

TECHNICAL FIELD

The present invention relates to a polycarbonate-modified acrylic resin which has high adhesion to a plastic substrate and is capable of forming a coating film having excellent abrasion resistance, chemical resistance, and feel; a coating; and a plastic molding coated with the coating.

BACKGROUND ART

Acrylic modified polyols which are obtained by reacting acrylic esters in the presence of a polyol have been proposed, and it has been known that cured coating films thereof have excellent mechanical properties, flexibility, and durability (for example, refer to Patent Literature 1).

However, although the coating films obtained from such acrylic modified polyols excel in terms of mechanical properties and the like, they have a drawback in that chemical resistance which has been required in coatings for plastic use and the like in recent years is insufficient. Accordingly, there has been a demand for a material that can impart excellent mechanical properties, chemical resistance, and feel to the surface of a plastic molding.

CITATION LIST

Patent Literature

PTL 1: Japanese Unexamined Patent Application Publication No. 2010-254948

SUMMARY OF INVENTION

Technical Problem

A technical problem of the present invention is to provide an acrylic resin which has high adhesion to a plastic substrate and is capable of forming a coating film having excellent abrasion resistance, chemical resistance, feel, and appearance; a coating; and a plastic molding coated with the coating.

Solution to Problem

The present inventors have performed thorough studies in order to solve the problem described above, and as a result, have found that, by using a specific polycarbonate-modified acrylic resin which is obtained by subjecting an unsaturated monomer mixture containing, as essential components, specific unsaturated monomers to polymerization reaction in the presence of a specific polycarbonate diol, high adhesion to a plastic substrate is achieved and it is possible to obtain a coating film having excellent abrasion resistance, chemical resistance, and feel. Thus, the present invention has been completed.

That is, the present invention relates to a polycarbonate-modified acrylic resin obtained by reacting an unsaturated monomer mixture (B), which contains, as essential components, methyl methacrylate, an unsaturated monomer (b1) having a hydroxyl group, an unsaturated monomer (b2) having a carboxyl group, and an unsaturated monomer (b3) having an alkyl group of 2 to 8 carbon atoms, in the presence of a polycarbonate diol (A) which is produced using 1,5-pentanediol and 1,6-hexanediol as starting materials, characterized in that the mass ratio of the unsaturated monomer (b2) in the unsaturated monomer mixture (B) is in the range of 0.1% to 1.6% by mass; a coating; and a plastic molding coated with the coating.

Advantageous Effects of Invention

The polycarbonate-modified acrylic resin according to the present invention has high adhesion to a plastic substrate and is capable of forming a coating film having excellent abrasion resistance, chemical resistance, and feel. Therefore, the polycarbonate-modified acrylic resin is useful for a coating, and the coating can be applied to various plastic moldings. Consequently, the polycarbonate-modified acrylic resin according to the present invention can be suitably used for a coating for application to housings of electronic devices, such as cellular phones, smartphones, tablet computers, personal computers, digital cameras, and game machines; housings of home electric appliances, such as televisions, refrigerators, washing machines, and air conditioners; interior materials of various vehicles, such as automobiles and railway vehicles; and various articles, such as bathtubs and fishing equipment.

DESCRIPTION OF EMBODIMENTS

A polycarbonate-modified acrylic resin according to the present invention is obtained by reacting an unsaturated monomer mixture (B), which contains, as essential components, methyl methacrylate, an unsaturated monomer (b1) having a hydroxyl group, an unsaturated monomer (b2) having a carboxyl group, and an unsaturated monomer (b3) having an alkyl group of 2 to 8 carbon atoms, in the presence of a polycarbonate diol (A) which is produced using 1,5-pentanediol and 1,6-hexanediol as starting materials, in which the mass ratio of the unsaturated monomer (b2) in the unsaturated monomer mixture (B) is in the range of 0.1% to 1.6% by mass.

First, a description will be made on the polycarbonate diol (A). The polycarbonate diol (A) is produced using 1,5-pentanediol and 1,6-hexanediol as starting materials, and for example, is obtained by reaction of 1,5-pentanediol and 1,6-hexanediol with a carbonate ester or phosgene.

Next, a description will be made on the unsaturated monomer mixture (B). The unsaturated monomer mixture (B) contains, as essential components, methyl methacrylate, an unsaturated monomer (b1) having a hydroxyl group, an unsaturated monomer (b2) having a carboxyl group, and an unsaturated monomer (b3) having an alkyl group of 2 to 8 carbon atoms, in which the mass ratio of the unsaturated monomer (b2) is in the range of 0.1% to 1.6% by mass.

Examples of the unsaturated monomer (b1) having a hydroxyl group include 2-hydroxyethyl (meth)acrylate, 3-hydroxypropyl (meth)acrylate, 4-hydroxy-n-butyl (meth)acrylate, 2-hydroxypropyl (meth)acrylate, 2-hydroxy-n-butyl (meth)acrylate, 3-hydroxy-n-butyl (meth)acrylate, 1,4-cyclohexane dimethanol mono(meth)acrylate, glycerol mono(meth)acrylate, polyoxyethylene mono(meth)acrylate, polyoxypropylene mono(meth)acrylate, polyoxybutylene mono(meth)acrylate, 2-hydroxy-3-phenoxypropyl (meth) acrylate, 2-(meth)acryloyloxyethyl-2-hydroxyethyl phthalate, and polycaprolactone-modified hydroxyethyl mono (meth)acrylate. Among them, 2-hydroxyethyl (meth) acrylate is preferable from the viewpoint of excellent appearance, chemical resistance, and abrasion resistance of the resulting coating film. Note that these unsaturated monomers (b1) can be used alone or in combination of two or more.

In the present invention, the term "(meth)acrylic acid" refers to one or both of methacrylic acid and acrylic acid, the term "(meth)acrylate" refers to one or both of a methacrylate and an acrylate, and the term "(meth)acryloyl group" refers to one or both of a methacryloyl group and an acryloyl group.

Examples of the unsaturated monomer (b2) having a carboxyl group include unsaturated monocarboxylic acids, such as (meth)acrylic acid, crotonic acid, β-carboxyethyl (meth)acrylate, ω-carboxy-polycaprolactone mono(meth) acrylate, 2-(meth)acryloyloxyethyl succinate, and 2-(meth) acryloyloxyethylhexahydro phthalic acid; and unsaturated dicarboxylic acids, such as maleic acid, fumaric acid, and itaconic acid, or half-esters of these unsaturated dicarboxylic acids. Among them, (meth)acrylic acid is preferable from the viewpoint of excellent abrasion resistance of the resulting coating film. Furthermore, these unsaturated monomers (b2) can be used alone or in combination of two or more.

Examples of the unsaturated monomer (b3) having an alkyl group of 2 to 8 carbon atoms include ethyl (meth) acrylate, n-propyl (meth)acrylate, isopropyl (meth)acrylate, n-butyl (meth)acrylate, isobutyl (meth)acrylate, t-butyl (meth)acrylate, n-pentyl (meth)acrylate, n-hexyl (meth) acrylate, n-heptyl (meth)acrylate, n-octyl (meth)acrylate, 2-ethylhexyl (meth)acrylate, and cyclohexyl (meth)acrylate. Among them, cyclohexyl (meth)acrylate is preferable because it improves chemical resistance and abrasion resistance of the resulting coating film. Furthermore, these unsaturated monomers (b3) can be used alone or in combination of two or more.

Furthermore, as a component of the unsaturated monomer mixture (B), another monomer (b4), other than methyl methacrylate, the unsaturated monomer (b1), the unsaturated monomer (b2), and the unsaturated monomer (b3) which are essential components, may be used. Examples of the other monomer (b4) include methyl acrylate, nonyl (meth)acrylate, decyl (meth)acrylate, dodecyl (meth)acrylate, tridecyl (meth)acrylate, cetyl (meth)acrylate, stearyl (meth)acrylate, behenyl (meth)acrylate, 4-tert-butylcyclohexyl (meth)acrylate, isobornyl (meth)acrylate, dicyclopentanyl (meth)acrylate, benzyl (meth)acrylate; acrylamide, N,N-dimethyl (meth)acrylamide, (meth)acrylonitrile, 3-(meth)acryloyloxy propyl trimethoxy silane, N,N-dimethylaminoethyl (meth)acrylamide, 2-(meth)acryloyloxy ethyl acid phosphate, glycidyl (meth)acrylate, vinyl acetate, styrene, α-methylstyrene, p-methylstyrene, p-methoxystyrene, and diacrylate compounds such as ethylene glycol diacrylate. Furthermore, these unsaturated monomers can be used alone or in combination of two or more.

In the unsaturated monomer mixture (B), the mass ratio of the unsaturated monomer (b2) is in the range of 0.1% to 1.6% by mass, but preferably in the range of 0.2% to 1.2% by mass, and more preferably in the range of 0.3% to 0.8% by mass, from the viewpoint of excellent appearance, chemical resistance, and abrasion resistance of the resulting coating film.

The unsaturated monomer mixture (B) contains, in addition to the unsaturated monomer (b2), as essential components, methyl (meth)acrylate, the unsaturated monomer (b1), and the unsaturated monomer (b3). From the viewpoint of excellent chemical resistance of the resulting coating film, preferably, the mass ratio of the methyl (meth)acrylate is in the range of 45% to 95% by mass, the mass ratio of the unsaturated monomer (b1) is in the range of 1% to 40% by mass, and the mass ratio of the unsaturated monomer (b3) is in the range of 1% to 30% by mass. More preferably, the mass ratio of the methyl (meth)acrylate is in the range of 60% to 90% by mass, the mass ratio of the unsaturated monomer (b1) is in the range of 3% to 30% by mass, and the mass ratio of the unsaturated monomer (b3) is in the range of 5% to 15% by mass.

Furthermore, the glass transition temperature calculated by the FOX equation (hereinafter, referred to as the "design Tg") of the unsaturated monomer mixture (A) is preferably in the range of 60° C. to 110° C. from the viewpoint of improvement in the chemical resistance and abrasion resistance of the resulting coating film.

In the present invention, the glass transition temperature calculated by the FOX equation is obtained by calculation in accordance with $$1/Tg = W1/Tg1 + W2/Tg2 + \quad \text{FOX equation:}$$

(where Tg is the glass transition temperature to be determined, W1 is the weight fraction of the component 1, and Tg1 is the glass transition temperature of the homopolymer of the component 1). Regarding the glass transition temperatures of the individual homopolymers, the values described in Polymer Handbook (4th Edition): J. Brandrup, E. H. Immergut, E. A. Grulke (Eds.); (Wiley Interscience) were used.

As the method for obtaining a polycarbonate-modified acrylic resin of the present invention by reacting the unsaturated monomer mixture (B) in the presence of the polycarbonate diol (A), a known polymerization method can be used. However, a solution radical polymerization method is preferable because it is simplest.

In the solution radical polymerization method, the monomers which are starting materials are dissolved in a solvent, and a polymerization reaction is performed in the presence of a polymerization initiator. Examples of the solvent that can be used in this case include aromatic hydrocarbon compounds, such as toluene and xylene; alicyclic hydrocarbon compounds, such as cyclohexane, methylcyclohexane, and ethylcyclohexane; ketone compounds, such as acetone, methyl ethyl ketone, methyl isobutyl ketone, and cyclohexanone; ester compounds, such as ethyl acetate, n-butyl acetate, isobutyl acetate, and propylene glycol monomethyl ether acetate; alcohol compounds, such as n-butanol, isopropyl alcohol, and cyclohexanol; glycol compounds, such as ethylene glycol monobutyl ether and propylene glycol monomethyl ether; and aliphatic hydrocarbon compounds, such as heptane, hexane, octane, and mineral turpentine.

Examples of the polymerization initiator include ketone peroxide compounds, such as cyclohexanone peroxide, 3,3,5-trimethylcyclohexanone peroxide, and methyl cyclohexanone peroxide; peroxyketal compounds, such as 1,1-bis(tert-butylperoxy)-3,3,5-trimethylcyclohexane, 1,1-bis (tert-butylperoxy)cyclohexane, n-butyl-4,4-bis(tert-butylperoxy)valerate, 2,2-bis(4,4-di-tert-butylperoxycyclohexyl)propane, 2,2-bis(4,4-di-tertamylperoxycyclohexyl)propane, 2,2-bis(4,4-di-tert-hexylperoxycyclohexyl)propane, 2,2-bis(4,4-di-tert-octylperoxycyclohexyl)propane, and 2,2-bis(4,4-dicumylperoxycyclohexyl)propane; hydroperoxide compounds, such as cumene hydroperoxide and 2,5-dimethylhexane-2,5-dihydroperoxide; dialkyl peroxide compounds, such as 1,3-bis(tert-butylperoxy-m-isopropyl)benzene, 2,5-dimethyl-2,5-di(tert-butylperoxy)hexane, diisopropylbenzene peroxide, tert-butylcumyl peroxide, and di-tert-butyl peroxide; diacyl peroxide compounds, such as decanoyl peroxide, lauroyl peroxide, benzoyl peroxide, and 2,4-dichlorobenzoyl peroxide; peroxycarbonate compounds, such as bis(tert-butylcyclohexyl) peroxydicarbonate; organic peroxides, such as peroxyester compounds, e.g., tert-butylperoxy-2-ethylhexanoate, tert-butylperoxybenzoate, and 2,5-dimethyl-2,5-di(benzoylperoxy) hexane; and azo compounds, such as 2,2'-azobisisobutyronitrile, 2,2'-azobis(2-methyl) butyronitrile, and 1,1'-azobis(cyclohexane-1-carbonitrile).

Furthermore, the mass ratio [(A)/(B)] of the polycarbonate diol (A) to the unsaturated monomer mixture (B) is preferably in the range of 5/95 to 80/20, more preferably in the range of 10/90 to 70/30, and still more preferably in the range of 20/80 to 60/40, from the viewpoint of excellent chemical resistance, abrasion resistance, and feel of the resulting coating film.

The hydroxyl number of the polycarbonate-modified acrylic resin of the present invention is preferably in the range of 20 to 150 from the viewpoint of improvement in the adhesion, chemical resistance, and abrasion resistance of the resulting coating film.

The hydroxyl number ratio [(OHA)/(OHB)] of the hydroxyl number (OHA) of the polycarbonate diol (A) to the hydroxyl number (OHB) of the unsaturated monomer mixture (B) is preferably in the range of 0.3 to 20, and more preferably in the range of 0.5 to 10, from the viewpoint of improvement in the appearance and chemical resistance of the resulting coating film. Note that the "hydroxyl number (OHB) of the unsaturated monomer mixture (B)" is the value obtained by calculation from the starting material compositions for the unsaturated monomers.

The weight-average molecular weight (Mw) of the polycarbonate-modified acrylic resin of the present invention is preferably in the range of 2,000 to 50,000, and more preferably in the range of 4,000 to 30,000, from the viewpoint of improvement in the abrasion resistance and chemical resistance of the resulting coating film. Note that the weight-average molecular weight (Mw) is the polystyrene equivalent value obtained from the measurement by gel permeation chromatography (hereinafter, referred to as "GPC").

A coating according to the present invention includes the polycarbonate-modified acrylic resin of the present invention, and preferably includes a curing agent (C) from the viewpoint of improvement in the physical properties of the resulting coating film.

As the curing agent (C), for example, a polyisocyanate compound, an amino resin, and the like may be used. From the viewpoint of excellent abrasion resistance and chemical resistance of the resulting coating film, a polyisocyanate compound is preferable. Furthermore, the curing agents (C) may be used alone or in combination of two or more.

Examples of the polyisocyanate compound include aromatic diisocyanate compounds, such as tolylene diisocyanate, diphenylmethane diisocyanate, m-xylylene diisocyanate, and m-phenylenebis(dimethylmethylene) diisocyanate; and aliphatic or alicyclic diisocyanate compounds, such as hexamethylene diisocyanate, lysine diisocyanate, 1,3-bis(isocyanatomethyl) cyclohexane, 2-methyl-1,3-diisocyanatocyclohexane, 2-methyl-1,5-diisocyanatocyclohexane, 4,4'-dicyclohexylmethane diisocyanate, and isophorone diisocyanate.

Furthermore, other examples of the polyisocyanate compound that can be used include prepolymers having an isocyanate group obtained by addition reaction of the diisocyanate compounds and a polyhydric alcohol; compounds having an isocyanurate ring obtained by cyclizing and trimerizing the diisocyanate compounds; polyisocyanate compounds having a urea bond or biuret bond obtained by reaction of the diisocyanate compounds with water; homopolymers of acrylic monomers having an isocyanate group, such as 2-isocyanatoethyl (meth)acrylate, 3-isopropenyl-α,α-dimethylbenzyl isocyanate, and (meth)acryloyl isocyanate; and copolymers having an isocyanate group obtained by copolymerization of the acrylic monomers having an isocyanate group and another acrylic monomer, a vinyl ester compound, a vinyl ether compound, an aromatic vinyl monomer, or a monomer, such as a fluoro-olefin.

The polyisocyanate compounds described above can be used alone or in combination of two or more.

In the case where the curing agent (C) is a polyisocyanate compound, the amount of the polyisocyanate compound added is set such that the equivalent ratio (isocyanate group/hydroxyl group) of the isocyanate group in the polyisocyanate compound to the hydroxyl group in the polycarbonate-modified acrylic resin of the present invention is preferably in the range of 0.5 to 2.0, and more preferably in the range of 0.7 to 1.3.

Furthermore, the urethane-forming reaction described above can be performed in the presence of a urethane-forming catalyst in order to accelerate the reaction. Examples of the urethane-forming catalyst include amine compounds, such as triethylamine; organotin compounds, such as dibutyltin dioctoate, dibutyltin dilaurate, dioctyltin dilaurate, octyltin trilaurate, dioctyltin dineodecanoate, dibutyltin diacetate, dioctyltin diacetate, and tin dioctoate; and organometallic compounds, such as zinc octoate (zinc 2-ethylhexanoate).

The coating of the present invention, which includes the polycarbonate-modified acrylic resin of the present invention and the curing agent (C), can also include additives, such as solvents, anti-foaming agents, viscosity modifiers, light stabilizers, weathering stabilizers, heat stabilizers, ultraviolet absorbers, antioxidants, leveling agents, and pigment dispersants. Furthermore, it is also possible to use pigments, such as titanium oxide, calcium carbonate, aluminum powder, copper powder, mica powder, iron oxide, carbon black, phthalocyanine blue, toluidine red, perylene, quinacridone, and benzidine yellow.

The coating of the present invention has high adhesion to a plastic substrate, and therefore, can be suitably used as a coating that is applied to various plastic moldings. Examples of the plastic molding to which the coating of the present invention can be applied include housings of electronic devices, such as cellular phones, smartphones, tablet computers, personal computers, digital cameras, and game machines; housings of home electric appliances, such as televisions, refrigerators, washing machines, and air conditioners; interior materials of various vehicles, such as automobiles and railway vehicles; and other moldings, such as bathtubs and fishing equipment.

Examples of the coating method for the coating of the present invention include a spray method, an applicator method, a bar coater method, a gravure coater method, a roll coater method, a comma coater method, a knife coater method, an air knife coater method, a curtain coater method, a kiss coater method, a shower coater method, a wheeler coater method, a spin coater method, a dipping method, and a screen printing method. Furthermore, after coating, as the method for forming a coating film, a method in which drying is performed in the range of room temperature to about 120° C. may be used.

EXAMPLES

The present invention will be described in more detail with reference to specific examples. Note that the hydroxyl number of the polycarbonate-modified acrylic resin of the present invention is determined in accordance with JIS test method K 0070-1992. Furthermore, the weight-average molecular weight (Mw) is measured under GPC measurement conditions described below.

[GPC Measurement Conditions]
Measuring device: high-speed GPC device ("HLC-8220GPC" manufactured by Tosoh Corporation)
Columns: The following columns manufactured by Tosoh Corporation were connected in series and used.
"TSKgel G5000" (7.8 mml. D.×30 cm)×1
"TSKgel G4000" (7.8 mml. D.×30 cm)×1
"TSKgel G3000" (7.8 mml. D.×30 cm)×1
"TSKgel G2000" (7.8 mml. D.×30 cm)×1
Detector: R1 (differential refractometer)
Column temperature: 40° C.
Eluent: tetrahydrofuran (THF)
Flow rate 1.0 mL/min
Injection volume: 100 μL (tetrahydrofuran solution with a sample concentration of 4 mg/mL)
Standard sample: Using the following monodisperse polystyrene, calibration curves were created.
(Monodisperse Polystyrene)
"TSKgel standard polystyrene A-500" manufactured by Tosoh Corporation
"TSKgel standard polystyrene A-1000" manufactured by Tosoh Corporation
"TSKgel standard polystyrene A-2500" manufactured by Tosoh Corporation
"TSKgel standard polystyrene A-5000" manufactured by Tosoh Corporation
"TSKgel standard polystyrene F-1" manufactured by Tosoh Corporation
"TSKgel standard polystyrene F-2" manufactured by Tosoh Corporation
"TSKgel standard polystyrene F-4" manufactured by Tosoh Corporation
"TSKgel standard polystyrene F-10" manufactured by Tosoh Corporation
"TSKgel standard polystyrene F-20" manufactured by Tosoh Corporation
"TSKgel standard polystyrene F-40" manufactured by Tosoh Corporation
"TSKgel standard polystyrene F-80" manufactured by Tosoh Corporation
"TSKgel standard polystyrene F-128" manufactured by Tosoh Corporation
"TSKgel standard polystyrene F-288" manufactured by Tosoh Corporation
"TSKgel standard polystyrene F-550" manufactured by Tosoh Corporation

Example 1

Synthesis of Polycarbonate-modified Acrylic Resin (1)

Into a flask equipped with a condenser, a thermometer, a dropping funnel, and a stirrer was placed 300 parts by mass of a polycarbonate diol produced using 1,5-pentanediol and 1,6-hexanediol as starting materials ("DURANOL T5652" manufactured by Asahi Kasei Chemicals Corporation, hydroxyl number 56.7, number-average molecular weight 2,000; hereinafter abbreviated as "polycarbonate diol (A-1)") along with 510 parts by mass of propylene glycol monomethyl ether acetate, and the temperature inside was raised to 135° C. Subsequently, a mixture (design Tg 93° C.) including 595 parts by mass of methyl methacrylate, 30.8 parts by mass of 2-hydroxyethyl acrylate, 4.2 parts by mass of methacrylic acid, 70 parts by mass of cyclohexyl methacrylate, 140 parts by mass of propylene glycol monomethyl ether acetate, and 10.5 parts by mass of tert-butylperoxybenzoate was added dropwise thereto over 5 hours. The reaction was continued at the same temperature for 17 hours after completion of dropping, and then dilution was performed using propylene glycol monomethyl ether acetate such that the non-volatile content was 60% by mass. Thereby, a solution of a polycarbonate-modified acrylic resin (1) having a hydroxyl number of 32 ([(OHA)/(OHB)]=1.1) and a weight-average molecular weight of 12,600 was obtained.

Example 2

Synthesis of Polycarbonate-modified Acrylic Resin (2)

Into a flask equipped with a condenser, a thermometer, a dropping funnel, and a stirrer was placed 500 parts by mass of a polycarbonate diol produced using 1,5-pentanediol and 1,6-hexanediol as starting materials ("DURANOL T5650J" manufactured by Asahi Kasei Chemicals Corporation, hydroxyl number 139.5, number-average molecular weight 800; hereinafter abbreviated as "polycarbonate diol (A-2)") along with 550 parts by mass of isobutyl acetate, and the temperature inside was raised to 110° C. Subsequently, a mixture (design Tg 93° C.) including 425 parts by mass of methyl methacrylate, 22 parts by mass of 2-hydroxyethyl acrylate, 3 parts by mass of methacrylic acid, 50 parts by mass of cyclohexyl methacrylate, 100 parts by mass of isobutyl acetate, and 7.5 parts by mass of tert-butylperoxy-2-ethylhexanoate was added dropwise thereto over 5 hours. The reaction was continued at the same temperature for 17 hours after completion of dropping, and then dilution was performed using isobutyl acetate such that the non-volatile content was 60% by mass. Thereby, a solution of a polycarbonate-modified acrylic resin (2) having a hydroxyl number of 81 ([(OHA)/(OHB)]=6.4) and a weight-average molecular weight of 14,600 was obtained.

Example 3

Synthesis of Polycarbonate-modified Acrylic Resin (3)

Into a flask equipped with a condenser, a thermometer, a dropping funnel, and a stirrer was placed 500 parts by mass of a polycarbonate diol produced using 1,5-pentanediol and 1,6-hexanediol as starting materials ("DURANOL T5650E"

manufactured by Asahi Kasei Chemicals Corporation, hydroxyl number 222.4, number-average molecular weight 500; hereinafter abbreviated as "polycarbonate diol (A-3)") along with 550 parts by mass of isobutyl acetate, and the temperature inside was raised to 110° C. Subsequently, a mixture (design Tg 93° C.) including 425 parts by mass of methyl methacrylate, 22 parts by mass of 2-hydroxyethyl acrylate, 3 parts by mass of methacrylic acid, 50 parts by mass of cyclohexyl methacrylate, 100 parts by mass of isobutyl acetate, and 7.5 parts by mass of tert-butylperoxy-2-ethylhexanoate was added dropwise thereto over 5 hours. The reaction was continued at the same temperature for 17 hours after completion of dropping, and then dilution was performed using isobutyl acetate such that the non-volatile content was 60% by mass. Thereby, a solution of a polycarbonate-modified acrylic resin (3) having a hydroxyl number of 122 ([(OHA)/(OHB)]=10.1) and a weight-average molecular weight of 15,700 was obtained.

Example 4

Synthesis of Polycarbonate-modified Acrylic Resin (4)

Into a flask equipped with a condenser, a thermometer, a dropping funnel, and a stirrer was placed 500 parts by mass of a polycarbonate diol produced using 1,5-pentanediol and 1,6-hexanediol as starting materials ("DURANOL T5651" manufactured by Asahi Kasei Chemicals Corporation, hydroxyl number 111.3, number-average molecular weight 1,000; hereinafter abbreviated as "polycarbonate diol (A-4)") along with 550 parts by mass of isobutyl acetate, and the temperature inside was raised to 110° C. Subsequently, a mixture (design Tg 93° C.) including 425 parts by mass of methyl methacrylate, 22 parts by mass of 2-hydroxyethyl acrylate, 3 parts by mass of methacrylic acid, 50 parts by mass of cyclohexyl methacrylate, 100 parts by mass of isobutyl acetate, and 7.5 parts by mass of tert-butylperoxy-2-ethylhexanoate was added dropwise thereto over 5 hours. The reaction was continued at the same temperature for 17 hours after completion of dropping, and then dilution was performed using isobutyl acetate such that the non-volatile content was 60% by mass. Thereby, a solution of a polycarbonate-modified acrylic resin (4) having a hydroxyl number of 67 ([(OHA)/(OHB)]=5.1) and a weight-average molecular weight of 17,700 was obtained.

Example 5

Synthesis of Polycarbonate-modified Acrylic Resin (5)

Into a flask equipped with a condenser, a thermometer, a dropping funnel, and a stirrer was placed 500 parts by mass of the polycarbonate diol (A-2) along with 550 parts by mass of propylene glycol monomethyl ether acetate, and the temperature inside was raised to 135° C. Subsequently, a mixture (design Tg 68° C.) including 343 parts by mass of methyl methacrylate, 105 parts by mass of 2-hydroxyethyl acrylate, 3 parts by mass of methacrylic acid, 50 parts by mass of cyclohexyl methacrylate, 100 parts by mass of propylene glycol monomethyl ether acetate, and 10 parts by mass of tert-butylperoxybenzoate was added dropwise thereto over 5 hours. The reaction was continued at the same temperature for 17 hours after completion of dropping, and then dilution was performed using propylene glycol monomethyl ether acetate such that the non-volatile content was 60% by mass. Thereby, a solution of a polycarbonate-modified acrylic resin (5) having a hydroxyl number of 121 ([(OHA)/(OHB)]=1.4) and a weight-average molecular weight of 7,700 was obtained.

Example 6

Synthesis of Polycarbonate-modified Acrylic Resin (6)

Into a flask equipped with a condenser, a thermometer, a dropping funnel, and a stirrer was placed 500 parts by mass of the polycarbonate diol (A-2) along with 550 parts by mass of propylene glycol monomethyl ether acetate, and the temperature inside was raised to 135° C. Subsequently, a mixture (design Tg 98° C.) including 402 parts by mass of methyl methacrylate, 45 parts by mass of 2-hydroxyethyl acrylate, 3 parts by mass of methacrylic acid, 50 parts by mass of cyclohexyl methacrylate, 100 parts by mass of propylene glycol monomethyl ether acetate, and 10 parts by mass of tert-butylperoxybenzoate was added dropwise thereto over 5 hours. The reaction was continued at the same temperature for 17 hours after completion of dropping, and then dilution was performed using propylene glycol monomethyl ether acetate such that the non-volatile content was 60% by mass. Thereby, a solution of a polycarbonate-modified acrylic resin (6) having a hydroxyl number of 92 ([(OHA)/(OHB)]=3.2) and a weight-average molecular weight of 8,400 was obtained.

Example 7

Synthesis of Polycarbonate-modified Acrylic Resin (7)

Into a flask equipped with a condenser, a thermometer, a dropping funnel, and a stirrer was placed 500 parts by mass of the polycarbonate diol (A-2) along with 550 parts by mass of propylene glycol monomethyl ether acetate, and the temperature inside was raised to 135° C. Subsequently, a mixture (design Tg 87° C.) including 425 parts by mass of methyl methacrylate, 22 parts by mass of 2-hydroxyethyl acrylate, 3 parts by mass of methacrylic acid, 50 parts by mass of n-butyl methacrylate, 100 parts by mass of propylene glycol monomethyl ether acetate, and 10 parts by mass of tert-butylperoxybenzoate was added dropwise thereto over 5 hours. The reaction was continued at the same temperature for 17 hours after completion of dropping, and then dilution was performed using propylene glycol monomethyl ether acetate such that the non-volatile content was 60% by mass. Thereby, a solution of a polycarbonate-modified acrylic resin (7) having a hydroxyl number of 81 ([(OHA)/(OHB)]=6.4) and a weight-average molecular weight of 9,500 was obtained.

Comparative Example 1

Synthesis of Resin for Comparison (R1)

Into a flask equipped with a condenser, a thermometer, a dropping funnel, and a stirrer was placed 500 parts by mass of the polycarbonate diol (A-2) along with 550 parts by mass of propylene glycol monomethyl ether acetate, and the temperature inside was raised to 135° C. Subsequently, a mixture (design Tg 93° C.) including 428 parts by mass of methyl methacrylate, 22 parts by mass of 2-hydroxyethyl acrylate, 50 parts by mass of cyclohexyl methacrylate, 100 parts by mass of propylene glycol monomethyl ether acetate, and 10 parts by mass of tert-butylperoxybenzoate was added dropwise thereto over 5 hours. The reaction was continued at the same temperature for 17 hours after completion of dropping, and then dilution was performed using propylene glycol monomethyl ether acetate such that the non-volatile content was 60% by mass. Thereby, a solution of a resin for comparison (R1) having a hydroxyl number of 81 ([(OHA)/(OHB)]=6.4) and a weight-average molecular weight of 8,400 was obtained.

Comparative Example 2

Synthesis of Resin for Comparison (R2)

Into a flask equipped with a condenser, a thermometer, a dropping funnel, and a stirrer was placed 500 parts by mass of the polycarbonate diol (A-2) along with 550 parts by mass of propylene glycol monomethyl ether acetate, and the temperature inside was raised to 135° C. Subsequently, a mixture (design Tg 93° C.) including 419 parts by mass of methyl methacrylate, 22 parts by mass of 2-hydroxyethyl acrylate, 9 parts by mass of methacrylic acid, 50 parts by mass of cyclohexyl methacrylate, 100 parts by mass of propylene glycol monomethyl ether acetate, and 10 parts by mass of tert-butylperoxybenzoate was added dropwise thereto over 5 hours. The reaction was continued at the same temperature for 17 hours after completion of dropping, and then dilution was performed using propylene glycol monomethyl ether acetate such that the non-volatile content was 60% by mass. Thereby, a solution of a resin for comparison (R2) having a hydroxyl number of 81 ([(OHA)/(OHB)]=6.4) and a weight-average molecular weight of 8,500 was obtained.

Comparative Example 3

Synthesis of Resin for Comparison (R3)

Into a flask equipped with a condenser, a thermometer, a dropping funnel, and a stirrer was placed 300 parts by mass of a polycarbonate diol produced using 1,6-hexanediol as a starting material ("DURANOL 56002" manufactured by Asahi Kasei Chemicals Corporation, hydroxyl number 53.3, number-average molecular weight 2,000; hereinafter abbreviated as "polycarbonate diol (RA-1)") along with 510 parts by mass of propylene glycol monomethyl ether acetate, and the temperature inside was raised to 135° C. Subsequently, a mixture (21.2, design Tg 93° C.) including 595 parts by mass of methyl methacrylate, 30.8 parts by mass of 2-hydroxyethyl acrylate, 4.2 parts by mass of methacrylic acid, 70 parts by mass of cyclohexyl methacrylate, 140 parts by mass of propylene glycol monomethyl ether acetate, and 14 parts by mass of tert-butylperoxybenzoate was added dropwise thereto over 5 hours. The reaction was continued at the same temperature for 17 hours after completion of dropping, and then dilution was performed using propylene glycol monomethyl ether acetate such that the non-volatile content was 60% by mass. Thereby, a solution of a resin for comparison (R3) having a hydroxyl number of 31 ([(OHA)/(OHB)]=1.1) and a weight-average molecular weight of 11,100 was obtained.

Comparative Example 4

Synthesis of Resin for Comparison (R4)

Into a flask equipped with a condenser, a thermometer, a dropping funnel, and a stirrer was placed 300 parts by mass of a polycarbonate diol produced using 1,4-butanediol and 1,6-hexanediol as starting materials ("DURANOL T4672" manufactured by Asahi Kasei Chemicals Corporation, hydroxyl number 53.3, number-average molecular weight 2,000; hereinafter abbreviated as "polycarbonate diol (RA-2)") along with 510 parts by mass of propylene glycol monomethyl ether acetate, and the temperature inside was raised to 135° C. Subsequently, a mixture (21.2, design Tg 93° C.) including 595 parts by mass of methyl methacrylate, 30.8 parts by mass of 2-hydroxyethyl acrylate, 4.2 parts by mass of methacrylic acid, 70 parts by mass of cyclohexyl methacrylate, 140 parts by mass of propylene glycol monomethyl ether acetate, and 14 parts by mass of tert-butylperoxybenzoate was added dropwise thereto over 5 hours. The reaction was continued at the same temperature for 17 hours after completion of dropping, and then dilution was performed using propylene glycol monomethyl ether acetate such that the non-volatile content was 60% by mass. Thereby, a solution of a resin for comparison (R4) having a hydroxyl number of 31 ([(OHA)/(OHB)]=1.1) and a weight-average molecular weight of 10,600 was obtained.

Comparative Example 5

Preparation of Resin for Comparison (R5)

As a resin for comparison (R5), 200 parts by mass (100 parts by mass as an acrylic resin (1)) of "ACRYDIC WXU-880-BA" (acrylic resin solution manufactured by DIC Corporation, non-volatile content 50% by mass, hydroxyl number of solid content 21; hereinafter abbreviated as the acrylic resin solution (1)) was used.

Comparative Example 6

Preparation of Resin for Comparison (R6)

30 Parts by mass of the polycarbonate diol (A-1) was diluted with 30 parts by mass of diacetone alcohol. Subsequently, 140 parts by mass of the acrylic resin solution (1) (70 parts by mass as the acrylic resin (1)) was added thereto, and then stirring was performed until homogeneity was achieved. Thereby, a resin for comparison (R6) having a hydroxyl number of 25 was obtained.

Comparative Example 7

Preparation of Resin for Comparison (R7)

100 parts by mass of the polycarbonate diol (A-1) was used as a resin for comparison (R7).

The compositions of the polycarbonate-modified acrylic resins (1) to (7) obtained as described above are shown in Table 1.

The compositions of the resins for comparison (R1) to (R7) are shown in Table 2.

TABLE 1

| | | | Example 1 | Example 2 | Example 3 | Example 4 | Example 5 | Example 6 | Example 7 |
|---|---|---|---|---|---|---|---|---|---|
| Composition (parts by mass) | Polycarbonate-modified acrylic resin | | (1) | (2) | (3) | (4) | (5) | (6) | (7) |
| | Polycarbonate diol | (A-1) | 300 | | | | | | |
| | | (A-2) | | 500 | | | 500 | 500 | 500 |
| | | (A-3) | | | 500 | | | | |
| | | (A-4) | | | | 500 | | | |
| | Unsaturated monomer mixture | MMA | 595 | 425 | 425 | 425 | 343 | 402 | 425 |
| | | Unsaturated monomer (b1) HEA | 30.8 | 22 | 22 | 22 | 105 | 45 | 22 |
| | | Unsaturated monomer (b2) MAA | 4.2 | 3 | 3 | 3 | 3 | 3 | 3 |
| | | Unsaturated monomer (b3) CHMA | 70 | 50 | 50 | 50 | 50 | 50 | |
| | | BMA | | | | | | | 50 |
| | Mass ratio (%) of unsaturated monomer (b2) | | 0.6 | 0.6 | 0.6 | 0.6 | 0.6 | 0.6 | 0.6 |
| | Polycarbonate diol/ unsaturated monomer mixture (mass ratio) | | 30/70 | 50/50 | 50/50 | 50/50 | 50/50 | 50/50 | 50/50 |
| | Hydroxyl number | | 32 | 81 | 122 | 67 | 121 | 92 | 81 |

TABLE 2

| | | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Composition (parts by mass) | Resin for comparison | | (R1) | (R2) | (R3) | (R4) | (R5) | (R6) | (R7) |
| | Polycarbonate diol | (A-1) | | | | | | 50 | 100 |
| | | (A-2) | 500 | 500 | | | | | |
| | | (RA-1) | | | 300 | | | | |
| | | (RA-2) | | | | 300 | | | |
| | Unsaturated monomer mixture | MMA | 428 | 419 | 595 | 595 | | | |
| | | Unsaturated monomer (b1) HEA | 22 | 22 | 30.8 | 30.8 | | | |
| | | Unsaturated monomer (b2) MAA | | 9 | 4.2 | 4.2 | | | |
| | | Unsaturated monomer (b3) CHMA | 50 | 50 | 70 | 70 | | | |
| | Mass ratio (%) of unsaturated monomer (b2) | | 0 | 1.8 | 0.6 | 0.6 | | | |
| | Acrylic resin (1) | | | | | | 100 | 50 | |
| | Polycarbonate diol/ unsaturated monomer mixture (mass ratio) | | 50/50 | 50/50 | 30/70 | 30/70 | | | |
| | Polycarbonate diol/ acrylic resin (mass ratio) | | | | | | 0/100 | 50/50 | 100/0 |
| | Hydroxyl number | | 81 | 81 | 31 | 31 | 21 | 25 | 56 |

The abbreviations shown in Tables 1 and 2 stand for the following:
MMA: methyl methacrylate
HEA: 2-hydroxyethyl acrylate
MAA: methacrylic acid
CHMA: cyclohexyl methacrylate
BMA: n-butyl methacrylate Example 8

Preparation and Evaluation of Coating (1)

[Preparation of Coating]
100 Parts by mass of the solution of the polycarbonate-modified acrylic resin (1) (non-volatile content 60% by mass) obtained in Example 1 and 8.6 parts by mass of a curing agent ("BURNOCK DN-980" manufactured by DIC Corporation, a polyisocyanate solution with a non-volatile content of 75% by mass) were mixed homogeneously. The mixing ratio of the polycarbonate-modified acrylic resin (1) and the curing agent was set such that the equivalent ratio of the hydroxyl group in the polycarbonate-modified acrylic resin (1) to the isocyanate group in the curing agent was 1:1. Next, dilution was performed using a mixed solution (methyl isobutyl ketone/diacetone alcohol/ethyl acetate/ isobutyl acetate=30/20/20/30 (mass ratio)) such that the viscosity measured by a "viscosity cup NK-2" manufactured by ANEST IWATA Corporation was 9 to 10 seconds (23° C.), and thereby, a coating (1) was prepared.

[Formation of Cured Coating Film X for Evaluation]
The coating (1) obtained as described above was spray-coated onto an ABS (acrylonitrile-butadiene-styrene copolymer) substrate (thickness 1 mm) such that the thickness of the film after drying was 20 to 30 μm. Drying was performed by heating at 80° C. for 30 minutes with a dryer, and then drying was performed at 25° C. for three days. Thereby, a cured coating film for evaluation was formed.

[Formation of Cured Coating Film Y for Evaluation]

The coating (1) obtained as described above was spray-coated onto a PC (polycarbonate) substrate (thickness 1 mm) such that the thickness of the film after drying was 20 to 30 µm. Drying was performed by heating at 80° C. for 30 minutes with a dryer, and then drying was performed at 25° C. for three days. Thereby, a cured coating film for evaluation was formed.

[Evaluation of Adhesion]

Cuts were made on each of the cured coating films X and Y for evaluation at a width of 2 mm, using a cutter, to form a right-angle lattice pattern having 100 squares. A cellophane adhesive tape was attached onto each of the cured coating films so as to cover all the squares, and then ripped off quickly. From the number of squares remained adhering, the adhesion was evaluated in accordance with the following criteria:

◯: 100 squares
Δ: 70 to 99 squares
×: 69 squares or less

[Evaluation of Abrasion Resistance]

Regarding the surface of the cured coating film X for evaluation, using a pencil specified in JIS S 6006: 2007, the procedure according to JIS K 5600-5-4:1999 was performed. The abrasion resistance was evaluated in accordance with the following criteria:

◯: No scratch mark occurs when 6B is used.
Δ: A slight scratch mark occurs when 6B is used.
×: A solid scratch mark occurs when 6B is used.

[Evaluation of Chemical Resistance]

A chemical ("Coppertone Sport Ultra Sweat-Proof SPF30" manufactured by SSL Health Care Japan Co, Ltd.) was applied in an amount of 12 mg/cm2 to the surface of the cured coating film X obtained as described above, and then drying was performed with a dryer at 55° C. for two hours. Subsequently, after the surface of the coating film was cleaned with a neutral detergent, the coating film was left to stand at room temperature for 24 hours. Then, the chemical resistance (adhesion and abrasion resistance after the chemical resistance test) was evaluated.

[Evaluation of Adhesion after Chemical Resistance Test]

An X-shaped cut was made on the coating film after the chemical resistance test. A cellophane adhesive tape was attached so as to cover the cut portion, and then ripped off quickly. The adhesion was evaluated in accordance with the following criteria.

◯: No peel-off of coating film occurs
Δ: Partial peel-off of coating film occurs.
×: The entire surface of coating film was peeled off.

[Evaluation of Abrasion Resistance after Chemical Resistance Test]

Regarding the surface of the coating film after the chemical resistance test, using a pencil specified in JIS S 6006: 2007, the procedure according to JIS K 5600-5-4:1999 was performed. The abrasion resistance was evaluated in accordance with the following criteria:

◯: No scratch mark occurs when 6B is used.
Δ: A slight scratch mark occurs when 6B is used.
×: A solid scratch mark occurs when 6B is used.

[Evaluation of Feel]

The surface of the cured coating film X for evaluation obtained as described above was touched with a finger, and the feel was evaluated in accordance with the following criteria:

◯: Having a moist feel.
Δ: Having a slightly moist feel.
×: Having no moist feel.

[Evaluation of Appearance]

The surface of each of the cured coating films X and Y for evaluation obtained as described above was visually observed, and the appearance was evaluated in accordance with the following criteria:

◯: Transparent
×: Cloudy

Examples 9 to 14

Preparation and Evaluation of Coatings (2) to (7)

Coatings were prepared by the same procedure as that of Example 8 except that the polycarbonate-modified acrylic resin (1) of Example 12 was changed to polycarbonate-modified acrylic resins (2) to (7). Then, cured coating films for evaluation were formed, and adhesion, abrasion resistance, chemical resistance, and feel were evaluated.

Comparative Examples 8 to 14

Preparation and Evaluation of Coatings (R1) to (R7)

Coatings were prepared by the same procedure as that of Example 8 except that the polycarbonate-modified acrylic resin (1) of Example 12 was changed to resins for comparison (R1) to (R7). Then, coating films for evaluation were formed, and adhesion, abrasion resistance, chemical resistance, and feel were evaluated.

The evaluation results of the coatings (1) to (7) and the coatings (R1) to (R7) obtained as described above are shown in Tables 3 and 4.

TABLE 3

| | | | Example 8 | Example 9 | Example 10 | Example 11 | Example 12 | Example 13 | Example 14 |
|---|---|---|---|---|---|---|---|---|---|
| | Coating | | (1) | (2) | (3) | (4) | (5) | (6) | (7) |
| Evaluation results | Adhesion | ABS substrate | ◯ | ◯ | ◯ | ◯ | ◯ | ◯ | ◯ |
| | | PC substrate | ◯ | ◯ | ◯ | ◯ | ◯ | ◯ | ◯ |
| | Abrasion resistance | | ◯ | ◯ | ◯ | ◯ | ◯ | ◯ | ◯ |
| | Chemical resistance | Adhesion | ◯ | ◯ | ◯ | ◯ | ◯ | ◯ | ◯ |
| | | Abrasion resistance | ◯ | ◯ | Δ | Δ | ◯ | ◯ | Δ |
| | Feel | | Δ | ◯ | ◯ | ◯ | ◯ | ◯ | ◯ |
| | Appearance | | ◯ | ◯ | ◯ | ◯ | ◯ | ◯ | ◯ |

TABLE 4

|  |  | Comparative Example 8 | Comparative Example 9 | Comparative Example 10 | Comparative Example 11 | Comparative Example 12 | Comparative Example 13 | Comparative Example 14 |
|---|---|---|---|---|---|---|---|---|
|  | Coating | (R1) | (R2) | (R3) | (R4) | (R5) | (R6) | (R7) |
| Evaluation results | Adhesion ABS substrate | ◯ | ◯ | ◯ | ◯ | ◯ | ◯ | ◯ |
|  | PC substrate | ◯ | ◯ | ◯ | ◯ | ◯ | ◯ | ◯ |
|  | Abrasion resistance | Δ | Δ | Δ | ◯ | ◯ | ◯ | Δ |
| Chemical resistance | Adhesion | ◯ | ◯ | ◯ | ◯ | ◯ | ◯ | Δ |
|  | Abrasion resistance | X | X | X | X | ◯ | Δ | X |
|  | Feel | ◯ | ◯ | X | X | X | Δ | ◯ |
|  | Appearance | ◯ | ◯ | ◯ | ◯ | ◯ | X | ◯ |

It has been confirmed that the cured coating films obtained from the polycarbonate-modified acrylic resins of the present invention in Examples 1 to 7 have excellent adhesion, abrasion resistance, chemical resistance, and feel (Examples 8 to 14).

In contrast, in Comparative Examples 1 and 2, in which the mass ratio of the unsaturated monomer having a carboxyl group in the unsaturated monomer mixture is out of the range of the present invention: 0.1 to 1.6 parts by mass, it has been confirmed that the resulting cured coating films have poor abrasion resistance and chemical resistance (Comparative Examples 8 and 9).

In Comparative Examples 3 and 4, in which polycarbonate diols produced using 1,5-pentanediol and 1.6 hexanediol are not used, it has been confirmed that the resulting cured coating films have poor chemical resistance and feel (Comparative Examples 10 and 11).

In Comparative Example 5, in which an acrylic resin that is not polycarbonate-modified is used, it has been confirmed that the resulting cured coating film has poor feel (Comparative Example 12).

In Comparative Example 6, which is an example of a mixture of a polycarbonate diol and an acrylic resin, it has been confirmed that the resulting cured coating film has poor appearance (Comparative Example 13).

In Comparative Example 7, which is an example of a polycarbonate diol, it has been confirmed that the resulting cured coating film has poor abrasion resistance (Comparative Example 14).

The invention claimed is:

1. A polycarbonate-modified acrylic resin obtained by reacting an unsaturated monomer mixture (B), which contains, as essential components, methyl methacrylate, an unsaturated monomer (b1) having a hydroxyl group, an unsaturated monomer (b2) having a carboxyl group, and an unsaturated monomer (b3) having an alkyl group of 2 to 8 carbon atoms, in the presence of a polycarbonate diol (A) which is produced using 1,5-pentanediol and 1,6-hexanediol as starting materials, characterized in that the mass ratio of the unsaturated monomer (b2) in the unsaturated monomer mixture (B) is in the range of 0.1% to 1.6% by mass.

2. The polycarbonate-modified acrylic resin according to claim 1, wherein the mass ratio [(A)/(B)] of the polycarbonate diol (A) to the unsaturated monomer mixture (B) is in the range of 5/95 to 70/30.

3. The polycarbonate-modified acrylic resin according to claim 1, wherein, in the unsaturated monomer mixture (B), the mass ratio of the methyl methacrylate is in the range of 45% to 95% by mass, the mass ratio of the unsaturated monomer (b1) is in the range of 1% to 40% by mass, and the mass ratio of the unsaturated monomer (b3) is in the range of 1% to 30% by mass.

4. The polycarbonate-modified acrylic resin according to claim 1, wherein the hydroxyl number ratio [(OHA)/(OHB)] of the hydroxyl number (OHA) originating from the polycarbonate diol (A) to the hydroxyl number (OHB) originating from the unsaturated monomer mixture (B) is in the range of 0.3 to 20.

5. A coating characterized by comprising the polycarbonate-modified acrylic resin according to claim 1 and a curing agent (C).

6. A plastic molding characterized by being coated with the coating according to claim 5.

* * * * *